Figure 1:
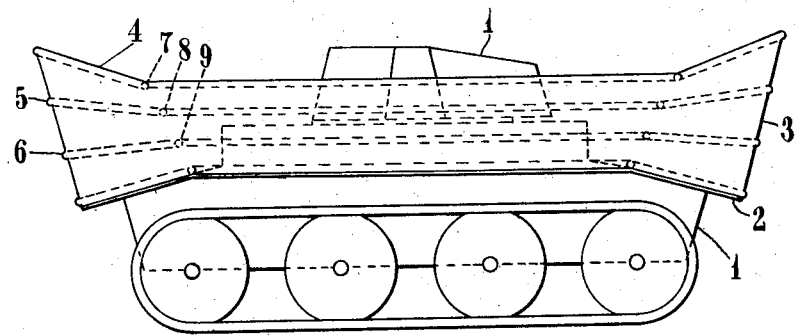

Dec. 11, 1945.   N. STRAUSSLER   2,390,747
MEANS FOR IMPARTING BUOYANCY TO VEHICLES
Filed March 13, 1942   3 Sheets-Sheet 1

Inventor
N. Straussler
By Glascock Downing Seebold
Attys

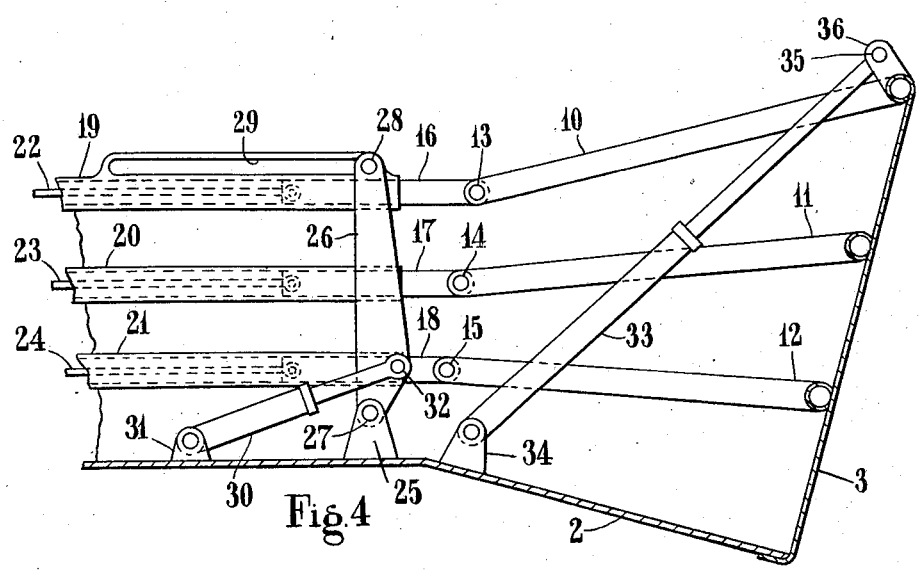
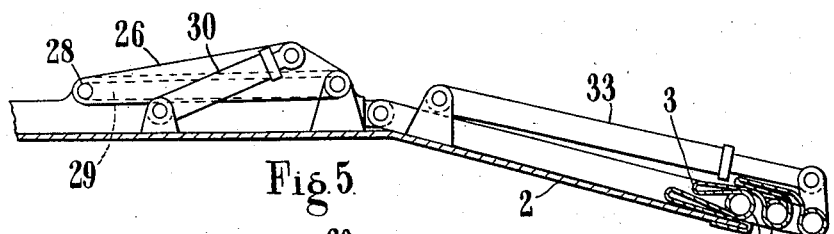
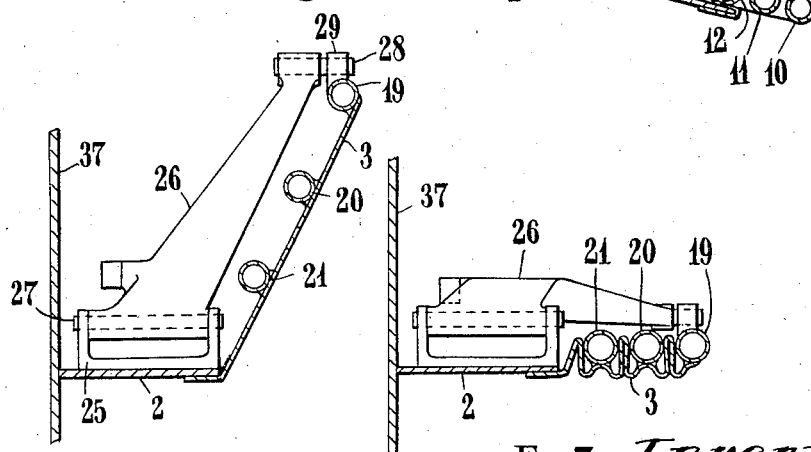

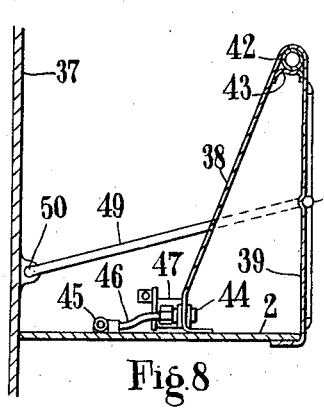
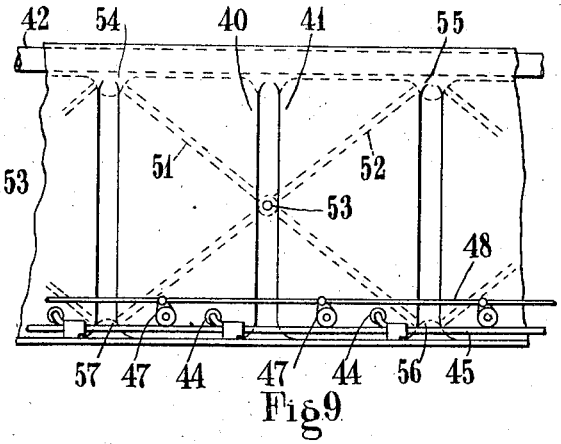
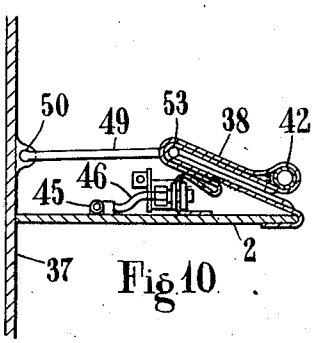
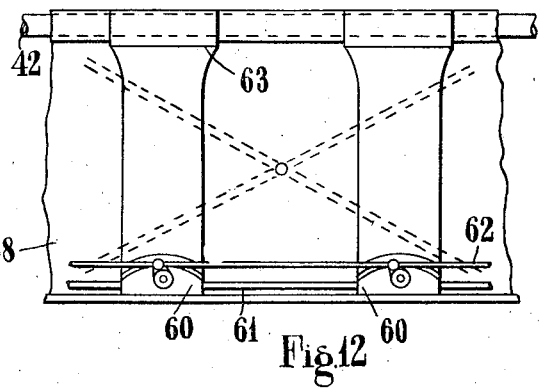
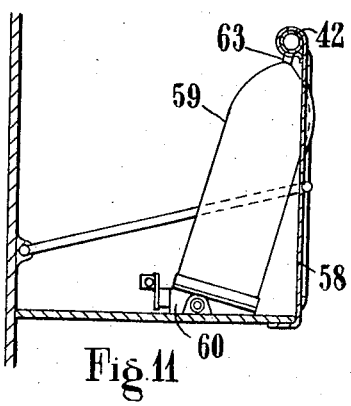
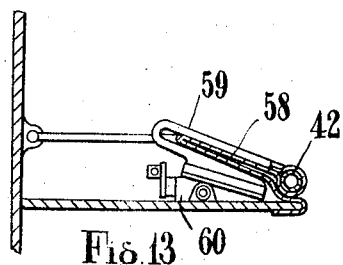

Patented Dec. 11, 1945

2,390,747

UNITED STATES PATENT OFFICE 2,390,747

MEANS FOR IMPARTING BUOYANCY TO VEHICLES

Nicholas Straussler, London S. W. 1, England

Application March 13, 1942, Serial No. 434,604
In Great Britain October 19, 1940

10 Claims. (Cl. 114—65)

This invention relates to means for imparting buoyancy to vehicles normally incapable of floating in water in order to render them capable of travel on water as well as land.

The invention finds particular, though not exclusive application, to motor propelled vehicles used for military purposes such as tanks, gun carriers or transport vehicles, in order to enable them to traverse rivers and other waterways. As will be understood, however, the invention is also applicable to hauled vehicles, such as trailers of motor propelled vehicles.

According to this invention a vehicle is provided with a collapsible superstructure resembling in the extended condition a flat or substantially flat bottomed boat, comprising a bottom in the form of an apron or tray adapted to be built around and attached to the vehicle, and upstanding sides or walls of flexible material so that the bulk of the vehicle projects partly upwards inside the boat and partly downwards beneath the said boat.

The apron or tray may be of metal or other suitable material and may be detachable from or permanently fixed to the vehicle.

The sides or walls may be of any suitable flexible material, for example, canvas rendered impervious to water, for example rubberised canvas, of one or more thicknesses or layers, and if desired may be in the form of an envelope or envelopes which are capable of inflation by air or other gas, or by providing suitable inflatable envelopes or gasbags between the thicknesses or layers.

To assist in maintaining the sides or walls of the superstructure in extended condition one or more stiffening frames of tubular steel or other suitable material may be embodied in or attached to the superstructure. The stiffening frames may be in sections hinged together at suitable points to permit the boat-shape superstructure to have greater depth towards its stem or both stem and stern and may also be made longitudinally extensible or telescopic to give a degree of rake to the stem or stem and stern if desired.

The superstructure may be erected by mechanical means such as screws or levers acting upon the fabric and/or its stiffening frames directly or indirectly through the medium of suitable linkages.

The superstructure may also be erected by hydraulic or pneumatic rams acting upon the fabric and/or its stiffening frames directly or indirectly through the medium of suitable linkages, the hydraulic or pneumatic rams being fed individually or collectively from one or more reservoirs the pressure in which may be maintained by manual, mechanical or electrical means.

In cases where the superstructure is arranged to contain air or any suitable inflation medium within the thickness of its walls, either by reason of the gastightness of the said walls or by reason of the use of suitable gasbags or envelopes within the thickness of the said walls, the said superstructure may be erected by inflating up to a stage where the internal pressure is adequate to hold the sides or walls sufficiently firm and taut to resist the inward pressure of the water when the vehicle is afloat. In those cases also the space within the thickness of the walls containing air or gas may be divided into a number of compartments, each in itself gastight and inflated individually or collectively from a high pressure cylinder or cylinders or from a suitable compressor or compressors. A suitable non-return valve may be utilized at the inlet to each compartment, envelope or gasbag so that a leakage from any of the said compartments, envelopes or gasbags does not result in a fall in the pressure in the remainder of the said compartments, envelopes or gasbags.

Additional rigidity may be given to the superstructure in the extended condition by the provision of suitable diagonal or angular stays between the vehicle and the walls and/or the stiffening frames.

The side walls may be arranged to fold down compactly on to the apron or tray and may be pulled into this condition by a number of springs or elastic cords acting upon the fabric and/or its stiffening frames directly or indirectly through the medium of suitable linkages. The superstructure may also be pulled into the retracted condition by reversal of the means used when erecting.

Figure 2:
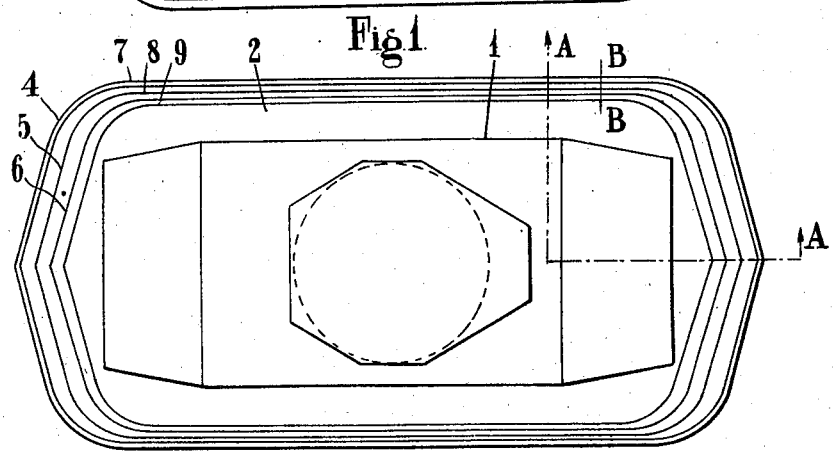
Figure 3:
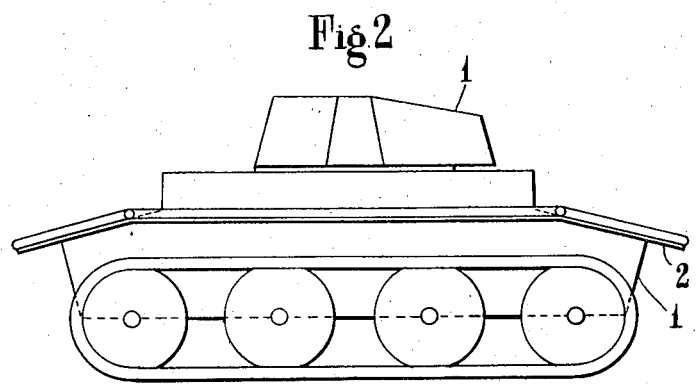

In order that the invention may be more readily understood and carried into effect, the same will now be described with reference to the accompanying drawings, in which:

Figure 1 is a side elevation showing the general layout of one modification of the invention as applied to a motor propelled track-laying vehicle in the form of a tank for military purposes, Figure 2 is a plan view of Figure 1, Figure 3 is a side elevation showing the superstructure in collapsed position, Figure 4 is a sectional elevation on a larger scale of a part of the superstructure, the section being taken on the line A—A of Figure 2, Figure 5 is a view similar to Figure 4 but with the superstructure in collapsed position, Figure 6 is a cross sectional elevation taken on the line B—B of Figure 2, Figure 7 is a view similar to Figure 6 but with the superstructure in collapsed position, Figure 8 is a cross sectional elevation similar to Figure 6 of a modified form of the invention, Figure 9 is a side elevation looking towards the right of Figure 8 and with the side wall of the vehicle omitted, Figure 10 is a view similar to Figure 8 but with the superstructure in collapsed position, and Figures 11, 12 and 13 are views respectively similar to Figures 8, 9 and 10, showing a further modification.

Referring to Figures 1 to 7, 1 is a motor propelled track-laying vehicle for example a military tank having a superstructure comprising an apron or tray 2, which may be of sheet metal, which extends round the vehicle and is arranged so that, as shown in Figure 1, the bulk of the vehicle projects partly upwardly and partly downwardly, the upper part of the vehicle being inside the superstructure when the latter is in extended position as hereafter described. As will be seen from Figure 1, the superstructure is of boat-like form when in extended position. The apron or tray is secured by its inner margins to side and end walls 37 of the vehicle, in any suitable manner to provide a water-tight joint between said walls and said margins of the apron or tray.

3 designates a continuous wall of the superstructure, which wall is of flexible material such as canvas impervious to water, for example rubberised canvas, and stiffened by frames hereinafter described in detail. The lower margin of the canvas is folded under the outer margin of the apron or tray and is secured to the latter in a water-tight manner.

4, 5 and 6 are frames hinge-jointed as at 7, 8 and 9 so as to allow the boat-like structure to have greater depth towards its ends. For this purpose also the end portions of the tray or apron may be downwardly inclined as shown in Figure 1.

Referring now to Figures 4 to 7 the frames comprise end sections 10, 11 and 12 of metal tubing and of bow-shape in plan view as shown in Figure 2, and pivoted or hinge-jointed at 13, 14 and 15 to straight sections of tubing 16, 17 and 18 which slide telescopically in the ends of tubular side portions 19, 20 and 21, and are pulled axially thereinto, Figure 5, by elastic cords 22, 23 and 24 within the portions 19, 20 and 21. The elastic cords are attached to the sections 16, 17 and 18 and suitable anchorages in the tubes 19, 20 and 21 or to the counterparts of 16, 17 and 18 in the opposite ends of the tubes 19, 20 and 21. The frames are secured in any suitable manner to the canvas.

Bracket 25 fixed to apron or tray 2 carries a lifting arm 26 pivoted at 27, and a pin 28 projects from the upper end of the arm 26 and engages in a slot or guide 29 attached to or integral with the upper frame member 19. Arm 26 is rotated about pivot 27 by a ram or piston having a cylinder 30 pivotally mounted on a reaction bracket 31 the ram or piston being pivoted to arm 26 by pin 32.

To secure the extra depth towards the ends of the boat-like structure the flexible material at these parts is of increasing depth and the end sections 10, 11 and 12 of the frames are secured thereto so that when the flexible material is extended as shown in Figure 4, the end sections 10, 11 and 12 diverge from their inner ends in an outward direction.

A second ram or piston is provided having a cylinder 33 pivoted on a reaction bracket 34 and the outer end of this ram or piston is pivoted by means of a pivot pin 35 mounted in a lug 36 fixed to or integral with end section 10. The rams or pistons may be actuated by air or liquid under pressure but alternately screw or ratchet jacks, manually operable, may be employed for extending the continuous wall.

Figure 5 shows a continuous wall of the superstructure in the collapsed position in which the stiffening frames are nested together and are supported by the apron or tray 2 and the arms 26. The rams are in their retracted positions in the cylinders 30 and 33 and arm 26 has swung through its full range of downward travel, pin 28 having traversed the length of slot or guide 29. The canvas 3 is folded as shown in Figures 5 and 7.

In Figures 8 and 9 the flexible walls of the superstructure are hollow, being formed by two layers of material 38 and 39 each united by its lower margin to the apron or tray 2 as shown, so as to form a gastight chamber between the layers, the intermediate portions of the flexible material being secured in a gastight manner to the frame 42. This gastight space may be divided by suitable flexible vertical partitions, into a number of independent compartments or pockets as 40 and 41. The frame 42 is supported towards the top edge of the hollow wall by a narrow strip of material 43 attached to the layers 38 and 39. The inflating medium is supplied to each compartment through a non-return valve 44 of known type from single supply pipe 45 and branch pipes 46. A normally closed outlet or release valve 47 of known type is provided for each compartment and these valves are operatively connected to a common control cable or rod 48 so that all the valves 47 can be opened whereby the compartments will collapse simultaneously. In order that the compartments collapse quickly after opening of the valves 47, the effective area of the latter is made greater than that of the non-return valves 44. An elastic cord 40 is attached at one end to a lug 50 on side wall 37 of the vehicle and extends between compartments 40 and 41 and is connected at its other end with crossed elastic cords 51 and 52 at the crossing. The ends of the cords 51 and 52 are connected to the outer layer at points 54, 55, 56 and 57 and at the crossing are connected at 53 to the outer layer approximately halfway between the top and bottom of the outer layer. The cords 49, 51 and 52 are under tension when the parts are in the position shown in Figures 8 and 9 so that when the gas pressure within the compartments is released by opening the outlet valves 47, the crossed cords 51 and 52 contract and pull down the flexible wall and its frame whilst the cord 49 contracts and pulls the middle of the wall inward towards the side of the vehicle until the parts with the wall folded are in the positions shown in Figure 10.

Referring now to Figures 11 and 12 a single layer of flexible material 58 impervious to water forms the continuous wall and is secured by its upper margin to a stiffening frame 42, the stiffening frame being supported and the wall maintained taut by the upward pressure resulting from inflation of flexible cylinders 59. Each flexible cylinder is sealed at its upper end 63 where it is attached to the stiffening frame 42, and the lower end is sealed on to a hollow base 60 having an inlet valve of known type through which air for inflation is supplied from a single pipe 61. Normally closed outlet valves of known type are operatively connected together by a cable 62 so that all the valves can be opened by pulling the cable 62 whereby the cylinders will be deflated simultaneously. Elastic cords 49, 51, 52 are provided for folding the side wall to the position shown in Figure 13. In this modification also the effective area of the outlet valves is preferably greater than that of the inlet valves so that rapid collapse of the cylinder will take place when the outlet valves are opened.

I claim:

1. A device for imparting buoyancy to a vehicle comprising a superstructure arranged about the exterior of the vehicle and having a bottom extending round and secured to the sides thereof, a continuous wall of flexible material, secured by one margin to said bottom and mechanical means for extending said wall upwardly and supporting it in extended position.

2. A device for imparting buoyancy to a vehicle comprising a superstructure arranged about the exterior of the vehicle and having a bottom extending round and secured to the sides thereof, a continuous wall of flexible material, secured by one margin to said bottom and mechanical means for extending said wall upwardly and supporting it in extended position, said mechanical means comprising a plurality of levers each pivoted at one end for movement about an axis fixed in relation to the bottom and having the other end slidably connected with a side portion of a stiffening frame secured to the wall and power means for moving said levers upwardly about their pivotal axes.

3. A device for imparting buoyancy to a vehicle comprising a superstructure arranged about the exterior of the vehicle and having a bottom extending round and secured to the sides thereof, a continuous wall of flexible material, secured by one margin to said bottom and mechanical means for extending said wall upwardly and supporting it in extended position, said mechanical means comprising a plurality of levers each pivoted at one end for movement about an axis fixed in relation to the bottom and having the other end slidably connected with a side portion of a stiffening frame secured to and extending round the upper margin of the wall, power means for moving said levers upwardly about their pivotal axes, a bow-shaped portion at one or both ends of said stiffening frame, said bow-shaped portions being pivoted on transverse axes to members slidable on said side members, and power means for actuating said bow members to move them upwardly about their pivotal axes.

4. A device for imparting buoyancy to a vehicle comprising a superstructure arranged about the exterior of the vehicle and having a bottom extending round and secured to the sides thereof, a continuous inflatable wall of flexible material carried by the bottom and which extends upwardly therefrom when inflated, and means for inflating and maintaining inflation of said wall.

5. A device for imparting buoyancy to a vehicle comprising a superstructure arranged about the exterior of the vehicle and having a bottom extending round and secured to the sides thereof, a continuous wall carried by the bottom, said wall comprising a plurality of inflatable compartments and extending upwardly from the bottom when the compartments are inflated, means for inflating said compartments simultaneously through inlet valves, one for each compartment, an outlet valve for each compartment and means for opening said outlet valves simultaneously.

6. A device for imparting buoyancy to a vehicle comprising a superstructure arranged about the exterior of the vehicle and having a bottom extending round and secured to the sides thereof, a continuous wall carried by the bottom, said wall comprising a plurality of inflatable compartments and extending upwardly from the bottom when the compartments are inflated, means for inflating said compartments simultaneously through inlet valves, one for each compartment, an outlet valve for each compartment, the effective area of the outlet valves being greater than that of the inlet valves and means for opening said outlet valves simultaneously.

7. A device for imparting buoyancy to a vehicle comprising a superstructure arranged about the exterior of the vehicle and having a bottom extending round and secured to the sides and ends thereof, a continuous inflatable wall of flexible material carried by the bottom and which extends upwardly from the latter when inflated, a stiffening frame secured to the upper part of the wall, and means for inflating and maintaining inflation of said wall.

8. A device for imparting buoyancy to a vehicle comprising a superstructure arranged about the exterior of the vehicle and having a bottom extending about and secured to the sides and ends thereof, a continuous inflatable wall of flexible material carried by the bottom and which extends upwardly from the latter when inflated, means for inflating and maintaining inflation of said wall, and elastic means, which is placed under tension by inflation of the wall, for folding the latter inwardly and downwardly on deflation thereof.

9. A device for imparting buoyancy to a vehicle comprising a superstructure arranged about the exterior of the vehicle and having a bottom extending about and secured to the sides and ends thereof, a continuous wall of flexible material carried by the bottom, a plurality of inflatable elements secured to the bottom and connected to the wall of flexible material, whereby said wall is extended upwardly from the bottom when said elements are inflated, and means for inflating and maintaining inflation of said elements.

10. A device for imparting buoyancy to a vehicle comprising a superstructure arranged about the exterior of the vehicle and having a bottom extending round and secured to the sides thereof, a continuous wall of flexible material secured by one margin to said bottom and having a plurality of stiffening frames secured thereto and mechanical means for extending said wall upwardly and supporting it in extended position.

NICHOLAS STRAUSSLER.